൝nited States Patent Office 3,012,944
Patented Dec. 12, 1961

3,012,944
ENZYME PREPARATION
Frederick C. Armbruster, La Grange, Ill., assignor to Corn Products Company, New York, N.Y., a corporation of Delaware
No Drawing. Filed Apr. 8, 1960, Ser. No. 20,807
10 Claims. (Cl. 195—31)

This invention relates to a novel method for the production of the enzyme glucamylase and to a process of hydrolyzing starch therewith.

An object of this invention is to provide a novel process for producing glucamylase by the use of a new and improved mutant strain of *Aspergillus niger*. Yet another object is to produce an enzyme system having a substantially lower transglucosidase:glucamylase ratio than prior art systems. Still a further object is to provide an improved process for producing glucamylase in substantially higher yields than was heretofore possible. A further object is to provide an improved process for hydrolyzing starch with an improved enzyme preparation. Other objects will appear hereinafter.

These objects are accomplished by the preparation and use of an artificially-induced mutant of *Aspergillus niger*.

Glucamylase preparations derived from the cultivation of strains of *Aspergillus niger* on nutrient media are particularly suitable for the conversion of amylaceous materials to dextrose. One of the disadvantages of previously used strains is that the glucamylase is produced in low concentrations in the fermentation medium, and therefore a large amount of fermentor capacity is required to produce sufficient glucamylase to convert a given amount of starch to dextrose. A further disadvantage to previously used strains is that the enzyme mixtures produced contain a substantial amount of transglucosidase.

The presence of this enzyme in the glucamylase preparations seriously limits the extent to which starchy materials can be converted to dextrose.

Amylase preparations derived from organisms of the *Aspergillus niger* group contain three major types of enzyme activities concerned with the hydrolysis of alpha-1,4-linked glucose polymers. These three types of activity may be classified as alpha-amylase activity, glucamylase activity, and transglucosidase activity.

Alpha-amylase action on starch pastes causes considerable reduction in viscosity. A further effect of alpha-amylase is to decrease the molecular weight of the starch so that the starch will no longer give a blue color when iodine is added. Alpha-amylase activity is usually measured by the rate of reduction of viscosity of a starch suspension, or by the rate at which the starch suspension is converted to the point at which the suspension stains red rather than blue upon the addition of iodine.

Glucamylase action on starch, dextrins, or maltose results in the formation of dextrose. This type of action has also been referred to as maltase activity, amyloglucosidase activity, glucogenic activity, starch-glucogenase activity, or gamma-amylase activity. Glucamylase activity may be measured by the rate of dextrose formation from starch, dextrins, or maltose.

Transglucosidase activity results in the formation, particularly from maltose, of unfermentable dextrose polymers containing alpha-1,6-glucosidic linkages. Transglucosidase activity may be measured by the rate or extent of unfermentable sugar formation from maltose. Among the factors which limit the yield of dextrose obtainable through fungal amylase saccharification of amylaceous materials is the enzymatic resynthesis of unfermentable carbohydrates by the action of transglucosidase. These unfermentable carbohydrates are not rehydrolyzed to dextrose at an appreciable rate by the enzyme present in the fungal amylase mixture, and therefore detract from the yield of dextrose obtainable.

The *Aspergillus niger* group is described by Thom and Raper, "A Manual of the Aspergilli" (Williams and Wilkins Co., Baltimore, 1945, pp. 214–240). A considerable effort has been spent in a comparison of numerous strains of members of the *Aspergillus niger* group for maximum production of glucamylase activity (Le Mense et al., J. Bact. 54, 149 (1947)); Corman and Langlykke, Cereal Chem. 25, 190 (1948); Pool and Underkofler, J. Agr. Food Chem. 1, 87 (1953). A considerable amount of additional effort has been expended in the development of media for maximum glucamylase production (Le Mense and Van Lanen, U.S. 2,451,567, October 19, 1949; Tsuchiya et al., Cereal Chem. 27 (1950); Corman, U.S. 2,557,078, June 19, 1951; Corman and Tsuchiya, U.S. 2,676,095, April 27, 1954). As a result of these investigations, *Aspergillus niger* NRRL 330 from the culture collection of the Northern Regional Research Laboratory at Peoria, Illinois (now known as the Northern Utilization Research Branch of the U.S. Department of Agriculture) has come to be accepted as the strain which produces maximum yields of glucamylase (Pan et al., Ind. Eng. Chem. 42, 1783 (1950); Pool and Underkofler, J. Agr. Food Chem. 1, 87, (1953); Hanson et al., Agr. and Food Chem. 3, 866 (1955).

Many strains of *Aspergillus niger* and strains of other members of the *Aspergillus niger* group have been examined in the assignee's laboratories. None of these strains, under comparable conditions of cultivation, has produced glucamylase yields appreciably higher than the yield produced by *Aspergillus niger* NRRL 330 or NRRL 337. Furthermore, the transglucosidase:glucamylase ratio in the enzyme mixtures present in the culture filtrates of these other strains was essentially the same as that present in culture filtrates of *Aspergillus niger* NRRL 330 or NRRL 337. The best of these many strains of *Aspergillus niger*, when cultured under the conditions herein described, produced in shake flask submerged culture glucamylase yields of about 1.5 to 1.9 units per ml. of culture filtrate. The transglucosidase:glucamylase ratio of the enzyme mixture was such that about 13 to 18 percent of maltose is converted to unfermentable sugars under the conditions of the test described herein.

I have now discovered that yields of glucamylase may be remarkably and unexpectedly increased by using a new and distinct culture hereinafter designated as *Aspergillus niger* mutant Armbruster C–14. This was a surprising result in view of the results referred to hereinabove. This new culture or mutant was obtained by subjecting spores of *Aspergillus niger* CPC M–370 to ultraviolet irradiation. The aforementioned cultures were deposited with the American Type Culture Collection, 2112 M Street, N.W., Washington, D.C., on May 25, 1959, and were assigned the following accession numbers:

*Aspergillus niger* mutant Armbruster C–14 No. 13497
*Aspergillus niger* CPC M–370 No. 13496

*Aspergillus niger* CPC M–370 was isolated from a soil sample obtained from Baton Rouge, Louisiana. It has the characteristics shown in Table I.

One means of obtaining the new mutant is described as follows:

A culture of *Aspergillus niger* CPC M–370 was grown on Czapek solution agar slants until the growth was well sporulated. The spores were then suspended in 0.001 percent sodium lauryl sulfate solution and irradiated with an ultraviolet light source for a period of time such that most of the viable spores were killed. The remaining viable spores were plated in known manner on Czapek solution agar plates and single spore isolates were obtained by known techniques. These procedures are similar to those employed by Hollaender et al. (Am. J. Botany 32, 160 (1945)).

Spore suspensions of the single spore isolates were again plated on Czapek solution agar and from these plates single spore isolates were again obtained.

The latter single spore isolates were tested for capacity to produce glucamylase as follows: A loop of spores from a Czapek solution agar slant was transferred to a 500-ml. Erlenmeyer flask containing 200 ml. of sterile medium of the following composition:

| | | |
|---|---|---|
| Corn steep liquor solids | percent | 1.0 |
| Ground yellow corn | do | 2.0 |
| Sodium hydroxide to pH | do | 6.0 |

The inoculated flask was incubated for 48 hours at 30 to 35° C. on a rotary shaker. Ten ml. of the 48 hour culture was then transferred to a second flask containing medium of the same composition. The second liquid transfer was incubated for 24 hours in the same manner as the first.

Ten ml. of the second liquid transfer was then transferred to a 1000-ml. Erlenmeyer flask containing the following:

| | | |
|---|---|---|
| Corn steep liquor solids | g | 2.0 |
| Ground yellow corn | g | 30.0 |
| Ammonium sulfate | g | 0.1 |
| Water | ml | 200 |
| Sodium hydroxide to pH | | 6.0 |

The neck of the Erlenmeyer flask was covered with two thicknesses of sterile Johnson and Johnson "Rapid-Flo" fiber bonded filter discs, and the flask was then incubated on a rotary shaker at 30 to 35° C. The shaker rotated the flask at 225 revolutions per minute in a circle 2¼ inches in diameter. Under these conditions, the glucamylase content of the culture attained a maximum in 4 days.

To obtain culture filtrate for measurement of glucamylase and transglucosidase activity, the entire contents of the flask was filtered. The mycelial cake was washed with 50 ml. of water. The wash filtrate and the culture filtrate were combined and diluted to 250 ml.

*Determination of glucamylase activity.*—The substrate was a 15 to 18 D.E. spray dried acid hydrolyzate of corn starch. This material was dissolved in water and diluted to 4.0 grams of dry substance per 100 ml. Exactly 50 ml. of the solution was pipetted into a 100-ml. volumetric flask. To the flask was added 5.0 ml. of pH 4.3, 1.0 molar sodium acetate-acetic acid buffer. The flask was placed in a water bath at 60° C., and after 10 minutes, the proper amount of enzyme preparation was added. At exactly 120 minutes after addition of the enzyme preparation, the solution was adjusted to a phenolphthalein end point with one normal sodium hydroxide. The solution was then cooled to room temperature, and diluted to volume. A reducing sugar value, calculated as dextrose, was determined on the diluted sample and on a control with no enzyme preparation added. Glucamylase activity was calculated as follows:

$$A = \frac{S-B}{2 \times E}$$

where, $A$ = glucamylase activity, units per ml. of enzyme preparation.
$S$ = reducing sugars in enzyme converted sample, grams per 100 ml.
$B$ = reducing sugars in control, grams per 100 ml.
$E$ = amount of enzyme preparation used, ml.
"$S$" should not exceed 1.0 gram per 100 ml.

In the case where the culture filtrate described above was combined with the wash water and diluted to 250 ml., the activity value obtained on the diluted sample was multiplied by 1.25 to compensate for the dilution.

*Determination of transglucosidase activity.*—A solution of maltose was prepared by dissolving 200 grams of Pfanstiehl C.P. maltose in water and diluting to 500 ml. Exactly 50 ml. was pipetted into a 100-ml. volumetric flask. To the flask was added 5.0 ml. of pH 4.3, 1.0 molar sodium acetate-acetic acid buffer. After mixing, an amount of enzyme preparation containing 2.8 units of glucamylase activity was added. The flask was placed in a 60° C. water bath. After 72 hours, the flask was placed in a boiling water bath for 15 minutes, then cooled, and the contents were transferred quantitatively to a 150-ml. beaker. The solution was adjusted to pH 4.8 with 2.0 normal sodium hydroxide solution, transferred to a 500-ml. Erlenmeyer flask, and diluted to about 200 ml. Ten grams of Fleischmann's active dry yeast was added, and the flask was shaken continuously for 5 hours at 30° C. The contents were then transferred to a 250-ml. volumetric flask and diluted to volume. Two hundred ml. were then centrifuged at 2000 r.p.m. for 15 minutes, and the supernatant liquor was decanted into a dry flask. Fifty ml. of this liquor was pipetted into a 70-ml. test tube, 5 ml. of 5.0 normal hydrochloric acid was added, the test tube was stoppered loosely, and was heated in a boiling water bath for 3 hours, then cooled in an ice bath. The contents of the tube was transferred to a 100-ml. volumetric flask, and adjusted with 2.0 normal sodium hydroxide to a phenolphthalein end point. After dilution to volume, a reducing sugar value, calculated as dextrose, is determined on an aliquot of the final solution. To obtain a correction for reducing sugar contributed by the yeast, a control sample was included in which 20 grams of pure dextrose hydrate was used in the place of maltose, no enzyme being added. The reducing sugar value of the enzyme-converted sample, corrected for reducing sugars contributed by the yeast, represented the unfermentable material synthesized by the enzyme preparation. Results were calculated as the percent of maltose converted to unfermentable sugars.

When fermentations were conducted as described above with *Aspergillus niger* strains NRRL 330, NRRL 337, or with *Aspergillus niger* strain CPC M–370, the best prior art strains, the glucamylase yield was of the order of 1.5 to 1.9 units of glucamylase per ml. of culture filtrate. The transglucosidase activity was such that 13 to 18 percent of the maltose was converted to unfermentable sugars.

With the new mutant, *Aspergillus niger* mutant C–14, the yield was 3.4 to 3.8 units of glucamylase per ml. of culture filtrate. The transglucosidase activity was such that only 7 to 8 percent of the maltose was converted to unfermentable sugars.

Of the many naturally accurring strains of *Aspergillus niger* and the numerous mutant strains of *Aspergillus niger* which have been examined, only *Aspergillus niger* mutant C–14 has shown the capacity for such an unexpectedly large increase of glucamylase production and at the same time the decreased transglucosidase activity.

The new mutant has been classified as a physiological mutant rather than a morphological mutant. Morphologically, the original strain of the new mutant is quite similar to many other strains in the *Aspergillus niger* series. The original strain of new mutant possesses many of the morphological characteristics of *Aspergillus niger* van Tieghem series and species, but overlaps in some characteristics the description of *Aspergillus awamori* Nakazawa (Thom and Raper, pp. 215–219). The morphological description of the original strain of the new mutant is shown in Table I.

*Aspergillus niger* mutant Armbruster C–14, and strains or variants thereof, are best characterized first in respect to the amount of glucamylase produced in comparison with known cultures, and second in respect to the lesser transglucosidase:glucamylase ratio of the enzymes present in the culture filtrates.

The main advantage of the first characteristic of the new mutant, i.e., the production of much greater amounts of glucamylase, is to produce a given amount of the enzyme only half the fermentor capacity is required. The main advantage of the second characteristic of the new mutant, i.e., the production of an enzyme composition of substantially decreased transglucosidase:glucamylase ratio, is an increased yield of dextrose in the hydrolysis of starch at lower cost. These advantages will be more apparent from Example I below, which along with the other examples is given for purposes of illustration and is not to be considered limiting.

TABLE I

|  | Aspergillus niger mutant Armbruster C-14 | Aspergillus niger CPC-M-370 |
| --- | --- | --- |
| Culture Medium | Czapek Solution Agar. | Czapek Solution Agar. |
| Temperature of Incubation. | 20-25° C | 20-25° C. |
| Colony Characters: |  |  |
| Rate of Growth | Rapid | Rapid. |
| Texture | Smooth to granular. | Smooth to granular. |
| Mycelium: |  |  |
| Submerged | Abundant | Abundant. |
| Floccose | Scant | Scant. |
| Color: |  |  |
| Above | Brown to black | Brown to black. |
| Reverse | Cream to brown | Cream to brown. |
| Heads: |  |  |
| Color | Brown to black | Brown to black. |
| Form | Globose | Globose. |
| Measurements | 275-500μ | 300-500μ. |
| Conidiophore: |  |  |
| Length | 600-900μ | 600-900μ. |
| Diameter | 12-17μ | 12-16μ. |
| Wall: |  |  |
| Thickness | Thick | Thick. |
| Markings | Smooth | Smooth. |
| Color | Tan to brown near vesicle. | Tan to brown near vesicle. |
| Vesicle: |  |  |
| Shape | Globose to sub-globose. | Globose. |
| Size | 30-60μ | 35-50μ. |
| Color | Brown | Brown. |
| Primary Sterigmata: |  |  |
| Measurements | 15-25 x 6-12 | 8-18 x 4-9. |
| Arrangement | Closely packed | Closely packed. |
| Color | Brown | Brown. |
| Secondary Sterigmata: |  |  |
| Measurements | 6-9 x 2-5μ | 4-6 x 3-5μ. |
| Conidia (Globose): |  |  |
| Color | Dark brown | Dark brown. |
| Measurements | 3-5μ | 3-5μ. |
| Markings | Spinulose | Spinulose. |
| Perithecia | None | None. |
| Sclerotia | None | None. |

*Example I*

Shake flask fermentations were conducted under the conditions described above using the four *Aspergillus niger* strains previously referred to. After 4 days of fermentation, the culture filtrates were employed in the saccharification of partially hydrolyzed starch as follows: A 35 percent by weight suspension of corn starch was acid hydrolyzed to a dextrose equivalent (D.E.) of 16. (Dextrose equivalent refers to the reducing sugar content of the hydrolyzate, calculated as dextrose, and expressed as percent by weight of the dry substance present.) The thinned starch was adjusted to pH 4.5, the temperature adjusted to 60° C., and an amount of the culture filtrate was added calculated to contain 14 units of glucamylase activity per 100 grams of starch dry substance. After 72 hours of incubation at 60° C., the liquors were analyzed for D.E. and dextrose.

Conversion of alpha-amylase thinned starch was carried out with the same enzyme preparations as follows: A 35 percent by weight suspension of corn starch was prethinned with an alpha-amylase preparation. Conversion of the alpha-amylase thinned starch was carried out as described above. These liquors were also analyzed after 72 hours of incubation.

| Culture | Aspergillus niger NRRL 330 | Aspergillus niger NRRL 337 | Aspergillus niger CPC M-370 | Aspergillus niger mutant Armbruster C-14 |
| --- | --- | --- | --- | --- |
| Yield of glucamylase, units per ml. of culture filtrate | 1.50 | 1.79 | 1.47 | 3.79 |
| Transglucosidase content, percent unfermentables formed from maltose | 12.5 | 13.9 | 15.4 | 8.4 |
| Conversion of 16 D.E. starch hydrolyzate |  |  |  |  |
| Ml. culture filtrate used per 100 g. of starch | 9.33 | 7.81 | 9.52 | 3.69 |
| D.E | 91.6 | 92.1 | 91.2 | 94.0 |
| Dextrose, percent D.B | 86.3 | 87.3 | 85.6 | 90.4 |
| Conversion of alpha-amylase thinned starch |  |  |  |  |
| Ml. culture filtrate used per 100 g. of starch | 9.33 | 7.81 | 9.52 | 3.69 |
| D.E | 95.8 | 95.6 | 95.4 | 98.4 |
| Dextrose, percent D.B | 93.5 | 93.1 | 92.8 | 97.8 |

*Example II*

This example shows the production and one method of recovery of glucamylase in purified form. It may also be purified by adsorption and elution, by treatment with ion-exchange resins, or by precipitation or fractionation by addition of salts.

Into a 50-liter fermentor, equipped for agitation and aeration, was placed 35 liters of medium of the following composition.

Ground yellow corn _____ 15.0 g. (D.B.) per 100 ml.
Corn steep liquor _____ 1.0 g. (D.B.) per 100 ml.
Ammonium sulfate _____ 0.05 g. per 100 ml.

The medium was adjusted to pH 6.2 and sterilized at 121° C. for one hour. It was then cooled to 34° C., and innoculated with 4 percent by volume of a 24-hour culture of *Aspergillus niger* mutant Armbruster C–14 grown on 2 percent corn, 1 percent corn steep liquor medium. Air was passed through the medium at a velocity of 30 feet per hour, and agitation was equivalent to 18 horsepower per 1000 gallons.

After 90 hours of fermentation, the entire contents of the fermenter was filtered. The filtrate had a glucamylase activity of 4.8 units per ml. The transglucosidase content of the filtrate was such that under the conditions of the test described above, only 8 percent of the maltose was converted to unfermentable sugars.

The filtrate was placed in a 40-liter vessel and agitated. To the agitated material was added 1.5 volumes of 2-propanol per volume of culture filtrate, and thereafter 1.0 gram diatomaceous earth filter aid per 100 ml. of culture filtrate. The suspension of enzyme plus filter aid was then filtered. The filter cake was resuspended in water and diluted to a volume equal to that of the original culture filtrate.

Conversion of 16 D.E. acid hydrolyzate of starch was carried out with the filtered but not further treated culture filtrate and with the preparation purified as described above. To one-liter portions of a 16 D.E. acid hydrolyzate of corn starch containing 350 grams of dry substance was added either 10.2 ml. of culture filtrate or 10.2 ml. of the purified enzyme preparation. The mixtures were then held at 60° C., pH 4.2–4.5 for 72 hours. Both liquors were found to have 94 D.E., and to contain 90.4 percent dextrose, dry basis.

*Example III*

This example shows the production of glucamylase in a large size fermentor.

Into a 1500 gallon fermentor was placed 1790 pounds of ground white corn containing 13 percent moisture.

Water was added, and sufficient corn steep liquor and ammonium sulfate was added to give final concentration of 8.33 and 0.417 pound D.S. per 100 gallons, respectively. The medium was sterilized. Volume after sterilization was 1270 gallons. After cooling to 93° F, the medium was inoculated with 2 percent by volume of a 24-hour culture of *Aspergillus niger* mutant Armbruster C–14. Agitation was supplied equivalent to 18 horsepower per 1000 gallons, and air was supplied at a velocity of 150 feet per hour. After 85 hours of fermentation, the culture filtrate had a glucamylase activity of 4.1 units per ml, and the transglucosidase activity of the culture filtrate was such that under the conditions of the tests described above, only 7.5 percent of the maltose was converted to unfermentable sugars.

*Example IV*

This example shows the production of glucamylase by mutant Armbruster C–14 when grown on media supplemented with protein sources other than corn steep liquor. Shake flask fermentations were conducted, as described above, using media composed of:

Ground yellow corn ---------------------- g --- 30.0
Protein source as indicated ------------- g --- 1.0
Water ---------------------------------- ml -- 200.0
Sodium Hydroxide to pH ----------------------- 5.5–6.5

Maximum glucamylase activity was attained between 4 and 6 days, depending on the protein source used. Results obtained with a few of the protein sources are shown below.

Protein source:

Yield of glucamylase, units per ml. of culture filtrate
  None ------------------------------------ 3.52
  Malt sprouts ---------------------------- 3.84
  Bacto proteose-peptone ------------------ 4.17
  Bacto malt extract ---------------------- 3.59
  Bacto tryptone -------------------------- 4.30
  Bacto peptone --------------------------- 3.88
  Vico yeast autolysate ------------------- 3.98
  NZ Amine (Type A) ----------------------- 3.76

*Example V*

This example shows the production of glucamylase with cultures derived from single spore isolates from mutant Armbruster C–14.

Spores from lyophilized cultures of *Aspergillus niger* mutant Armbruster C–14 were plated on Czapek solution agar and cultures derived from single spore isolates were obtained in known manner. Shake flask fermentrations were carried out with the single spore isolates as described above. Culture filtrates from the great majority of the single spore isolates produced the same yield of glucamylase and transglucosidase as the parent C–14 culture. Results obtained with a few of the better strains are shown below:

| | Aspergillus niger Mutant Armbruster C-14 | Single Spore Isolates from Aspergillus niger Mutant Armbruster C-14 | | | |
|---|---|---|---|---|---|
| | | C-14.1 | C-14.2 | C-14.3 | C-14.4 |
| Yield of Glucamylase, units per ml. of Culture Filtrate | 3.86 | 4.85 | 4.28 | 4.54 | 4.09 |

The morphological characteristics of the cultures shown above fell within the *Aspergillus niger* series as described by Thom and Raper. All produced at least about twice as much glucamylase activity as *Aspergillus niger* NRRL 330 or *Apsergillus niger* NRRL 337, and all produced an enzyme mixture having a transglucosidase:glucamylase ratio not more than about half that of the enzyme mixture produced by *Aspergillus niger* NRRL 330 or by *Aspergillus niger* NRRL 337 under comparable conditions of cultivation.

*Example VI*

This example shows the production of glucamylase with strains of the new mutant derived by mutation of the original strain of *Aspergillus niger* mutant Armbruster C–14.

A spore suspension of *Aspergillus niger* mutant Armbruster C–14 was subjected to ultraviolet irradiation as described previously. Single spore isolates were obtained from the survivors by the techniques previously described. Each of the single spore isolates were tested for glucamylase production in shake flask fermentations. The majority of these isolates produced the same yield of glucamylase as the parent C–14 culture. A few produced substantially higher yields, as shown below.

Culture:

Yield of glucamylase, units per ml. of culture filtrate
  Mutant C–14 ----------------------------- 3.83
  Strain C–14a ---------------------------- 4.32
  Strain C–14b ---------------------------- 5.12
  Strain C–14c ---------------------------- 4.31
  Strain C–14d ---------------------------- 4.40

Some of these sub-mutant strains differed considerably in morphology from the parent culture and from typical members of the *Aspergillus niger* series. However, all cultures which produced glucamylase yields equal or superior to the yield produced by the original strain of *Aspergillus niger* mutant Armbruster C–14, also produced an enzyme mixture having a transglucosidase:glucamylase ratio of about half the ratio in the enzyme mixture produced by *Aspergillus niger* NRRL 330 or *Aspergillus niger* NRRL 337.

Although the morphological description of one strain of *Aspergillus niger* mutant Armbruster C–14 is given in Table I, it will be obvious to those skilled in the art that the production of a physiological mutant may be accompanied by morphological changes, but that the variation in biochemical activity is not related to a specific morphological change. It will also be obvious that a particular mutant may be isolated from natural sources as well as from survivors of exposure to artificial mutagenic agents. It will further be obvious that within the *Aspergillus niger* series, the same type of mutant can be obtained from different species, and that the type of mutant produced upon exposure to mutagenic agents is not dependent on the type of mutagenic agent used.

Therefore, although the description shown in Table I describes a strain of *Aspergillus niger* mutant Armbruster C–14 derived by mutation of *Aspergillus niger* CPC M–370 with ultraviolet irradiation, this morphological description does not characterize all strains, variants, or sub-mutants of the new mutant, nor does it distinguish the new mutant from other strains or species of the *Aspergillus niger* series. However, *Aspergillus niger* mutant Armbruster C–14 can be readily identified by application of the following criteria:

(1) Morphology falling within the *Aspergillus niger* series as described by Thom and Raper, p. 215.
(2) Production under identical conditions of cultivation, particularly under those conditions described herein, of at least about twice as much glucamylase activity as *Aspergillus niger* NRRL 330 or *Aspergillus Niger* NRRL 337.
(3) Production under identical conditions of cultivation, particularly under those conditions described herein, of an enzyme mixture having a transglucosidase:glucamylase ratio not more than about 60 percent of that of the enzyme mixture produced by *Aspergillus niger* NRRL 330 or *Aspergillus niger* NRRL 337.

The term *Aspergillus niger* mutant Armbruster C–14 as used herein is intended to include those cultures of the *Aspergillus niger* series showing the properties given above as criteria for the identification of the new mutant.

This application is a continuation-in-part of U.S. application Serial No. 815,262, filed May 25, 1959.

I claim:

1. Process for the production of glucamylase which comprises fermenting a nutrient medium with the organism, *Aspergillus niger* mutant Armbruster C-14 ATCC 13497, said organism being characterized by the production, under comparable conditions of cultivation, of at least about twice as much glucamylase as that produced by the strains *Aspergillus niger* NRRL 330 and NRRL 337, and of an enzyme mixture having a substantially lower transglucosidase:glucamylase ratio than that of the enzyme mixture produced by the strains *Aspergillus niger* NRRL 330 and NRRL 337.

2. Process for the production of glucamylase which comprises fermenting a nutrient medium with a naturally occurring variant of *Aspergillus niger* mutant Ambruster C-14 ATCC 13497, said variant being physiologically characterized by the production, under comparable conditions of cultivation, of at least about twice as much glucamylase as that produced by the strains *Aspergillus niger* NRRL 330 and NRRL 337.

3. Process for the production of glucamylase which comprises fermenting a nutrient medium with an artificially induced variant of *Aspergillus niger* mutant Armbruster C-14 ATCC 13497, said variant being physiologically characterized by the production, under comparable conditions of cultivation, of at least about twice as much glucamylase as that produced by the strains *Aspergillus niger* NRRL 330 and NRRL 337.

4. Process for the fermentative production of a fungal culture liquor, the filtrate therefrom having a glucamylase activity of at least about twice that produced by *Aspergillus niger* srains NRRL 330 and NRRL 337 under identical conditions of cultivation, which comprises fermenting a nutrient medium with *Aspergillus niger* mutant Armbruster C-14, ATCC 13497.

5. Process for the hydrolysis of amylaceous materials comprising subjecting the gelatinized material to the action of an enzyme preparation derived from *Aspergillus niger* mutant Armbruster C-14, ATCC 13497.

6. Process for the hydrolysis of starch with an enzyme which comprises initially partially hydrolyzing the starch to reduce the viscosity thereof and thereafter subjecting it to the action of the enzyme produced in accordance with claim 1.

7. A process for producing *Aspergillus niger* mutant Armbruster C-14, ATCC 13497 which comprises subjecting spores of the organism *Aspergillus niger* CPC M-370 ATCC 13496 to mutagenic agents, and isolating from the survivors single spore cultures of said mutant which are physiologically characterized by having the capacity to produce glucamylase in yields at least about 50 percent greater than the original organism ATCC 13496.

8. Process for the production of a starch-saccharifying enzyme preparation, comprising fermenting a nutrient medium with an organism selected from the group consisting of *Aspergillus niger* mutant Armbruster C-14, ATCC 13497 and the naturally occurring and artifically induced variants of said mutant, said organism being physiologically characterized by the production, under comparable conditions of cultivation, of at least about twice as much glucamylase as that produced by *Aspergillus niger* NRRL 330 or NRRL 337, and being further characterized by the production, under the same conditions of cultivation, of an enzyme mixture having a substantially lower transglucosidase:glucamylase ratio than the mixture produced by *Aspergillus niger* NRRL 330 or NRRL 337.

9. Process for the conversion of starch to dextrose in yields of greater than about 90 percent, comprising thinning the gelatinized starch with acid to reduce the viscosity thereof, and thereafter subjecting the thinned starch to the action of an enzyme preparation according to claim 8.

10. Process for the conversion of starch to dextrose in yields of greater than about 95 percent, comprising thinning the gelatinized starch with an enzyme to reduce the viscosity thereof, and thereafter subjecting the thinned starch to the action of an enzyme preparation produced according to claim 8.

References Cited in the file of this patent

UNITED STATES PATENTS

| 2,881,115 | Liggett et al. | Apr. 7, 1959 |
| 2,893,921 | Langlois et al. | July 7, 1959 |

OTHER REFERENCES

Journal of Bacteriology, vol. 54, 1947, pages 149 to 159, Williams and Wilkins Co., Baltimore, Md.

Industrial Microbiology, 2nd Ed., 1949, pages 84 to 88, McGraw-Hill Book Co., N.Y.

UNITED STATES PATENT OFFICE

CERTIFICATION OF CORRECTION

Patent No. 3,012,944            December 12, 1961

Frederick C. Armbruster

It is hereby certified that error appears in the above numbered patent requiring correction and that the said Letters Patent should read as corrected below.

Column 3, line 17, strike out "do"; column 9, line 36, for "srains" read -- strains --; column 10, line 29, after "preparation" insert -- produced --.

Signed and sealed this 17th day of April 1962.

(SEAL)
Attest:

ESTON G. JOHNSON              DAVID L. LADD
Attesting Officer              Commissioner of Patents